United States Patent [19]

DeFee

[11] Patent Number: 5,772,444
[45] Date of Patent: Jun. 30, 1998

[54] METHOD AND ARTICLE FOR TEACHING THE CORE CONSTRUCTION OF THE SINGULARITY MOTION

[76] Inventor: James M. DeFee, 2300-24th Ave. South, Minneapolis, Minn. 55406

[21] Appl. No.: 799,229

[22] Filed: Feb. 14, 1997

[51] Int. Cl.[6] .................................................. G09B 23/06
[52] U.S. Cl. .......................................... 434/300; 434/281
[58] Field of Search .................................... 434/281, 300, 434/302

[56] References Cited

U.S. PATENT DOCUMENTS

| | | | |
|---|---|---|---|
| 3,276,148 | 10/1966 | Snelson | 434/281 |
| 3,406,972 | 10/1968 | Wong | 434/281 |
| 3,623,239 | 11/1971 | Maslokovets | 434/306 |
| 4,099,340 | 7/1978 | Butler | 434/300 |
| 4,810,197 | 3/1989 | Hicks | 434/281 |
| 5,145,378 | 9/1992 | Rott et al. | 434/300 |
| 5,192,212 | 3/1993 | Kim | 434/300 |

*Primary Examiner*—Paul L. Hirsch
*Attorney, Agent, or Firm*—Patterson & Keough, P.A.

[57] ABSTRACT

The invention comprises an article useful in teaching the core construction of the Yin and Yang symbol, as well as various scientific theories. The invention includes a template mechanism useful in practicing the various methods described in the invention, as well as being useful for practicing the methods taught by the invention.

18 Claims, 19 Drawing Sheets

THE 16 CHANGES OF "S.U.S." MOTION.

THE GEOMETRY OF THE MOTION OF THE PRIMAL MONAD.

METHOD AND ARTICLE FOR TEACHING THE CORE CONSTRUCTION OF THE SINGULARITY MOTION

FIELD OF THE INVENTION

This invention relates to the field of physics, and more particularly to a method and apparatus for teaching the theory of the singularity.

BACKGROUND OF THE INVENTION

Numerous theories have been advanced regarding the relationship of matter at the sub-atomic level. Indeed, many of these theories are widely accepted and practiced as fundamental teachings of modern science. Within this realm, the concept of the singularity is discussed in various teaching modes, including for example in the landmark publication by the renowned physicist Dr. Steven Hawkings, titled "A Brief History of Time".

Indeed, other theories exist which also relate to interaction of matter at the sub-atomic level. These theories encompass the fields of astro-physics, biology, cosmology, and many others. For example, some of these theories include the concepts of gravity waves, dark matter, anti-matter, particle wave theory, and ripples in cosmic background radiation. While a detailed discussion of these theories is possible, no one theory has addressed the features of the below described invention.

SUMMARY OF THE INVENTION

The invention comprises an article useful in teaching the core construction of the yin and yang symbol. The article comprises an outer circle defining two equal internal sections separated by a first doubly curved line having a first and second equal length portion each within any different hemisphere of the outer circle. An internal spiral start point is located at a distance of one-third the length of an outer circle diameter defined by the intersections of the first doubly curved line with the outer circle. A first internal spiral first section comprises a curved line extending from the start point to a reference point located at a distance of two-thirds the length of the selected outer circle diameter. Also, the internal spiral first section has a shape of a semicircle and is located so that a first half of the semicircle intersects the first doubly curved line. A first internal spiral second section is also provided and comprises a curved line extending as a semicircle from the reference point to a first end point of the outer circle diameter located at the intersection of the outer circle diameter with the outer circle at a zero distance along the outer circle diameter.

The invention also comprises a method of using the yin and yang symbol to teach the scientific theory of the singularity. The method comprises the steps of providing a modified yin and yang symbol comprising the elements of an outer circle, an internal spiral start point, a first internal spiral first section, and a first internal spiral second section. The outer circle defines two equal internal sections separated by a first doubly curved line having a first and a second equal length portion each within any different hemisphere of the outer circle. The internal spiral start point is located at a distance of one-third the length of an outer circle diameter defined by the intersections of the first doubly curved line with the outer circle. The first internal spiral first section comprises a curved line extending from the start point to a reference point located at a distance of two-thirds the length of the selected outer circle diameter. The internal spiral first section has a shape of a semi-circle and is located so that a first half of the semicircle intersects the first doubly curved line. The first internal spiral second section comprises a curved line extending as a semicircle from the reference point to a first end point of the outer circle diameter located at the intersection of the outer circle diameter with the outer circle at a zero distance along the outer circle diameter. The method then comprises the step of designating the internal spiral start point as a representative point of singularity, and then demonstrating the path of motion of the point of singularity from the internal spiral start point along various parts until the point of singularity returns to the internal spiral start point. Using this method, the theory of the singularity is shown by the geometry of the motion of the point of singularity as one which recreates itself in a unified pattern. The invention also includes a template mechanism useful in practicing the various methods of the invention.

These figures, which are idealized, are not to scale and are intended to be merely illustrative and non-limiting.

DETAILED DESCRIPTION OF THE INVENTION

Within the fields of physics and more particularly astrophysics, the concept of the singularity is often raised. For example, this theoretical concept is discussed by Hawkings in "A Brief History of Time", as well as in a more recently published article by Madhusree Mukerjee, Explaining Everything Scientific American, pp. 88–94, January 1996. This concept has also been discussed in other literature by pre-eminent researchers, theologians, natural philosophers, and theorists. However, in view of the difficulty of many to comprehend abstract theoretical scientific principals, it is useful to create a multi-dimensional model to assist in the teaching of this and related concepts. In researching this problem, it has been discovered that a useful model may be derived from embodiments of the ancient yin and yang symbol 10 shown in one embodiment in FIG. 1. Typically, this symbol is displayed as an outer circle 14 defining two equal internal sections 18, 20. These equal internal sections are normally separated by the boundary which creates a first doubly curved line 24 having a first and second equal length portion each within any different hemisphere of the outer circle 14. According to various embodiments, symbol 10 may optionally include very small dark and light circles 26, 28 respectively as shown.

Figure 2:
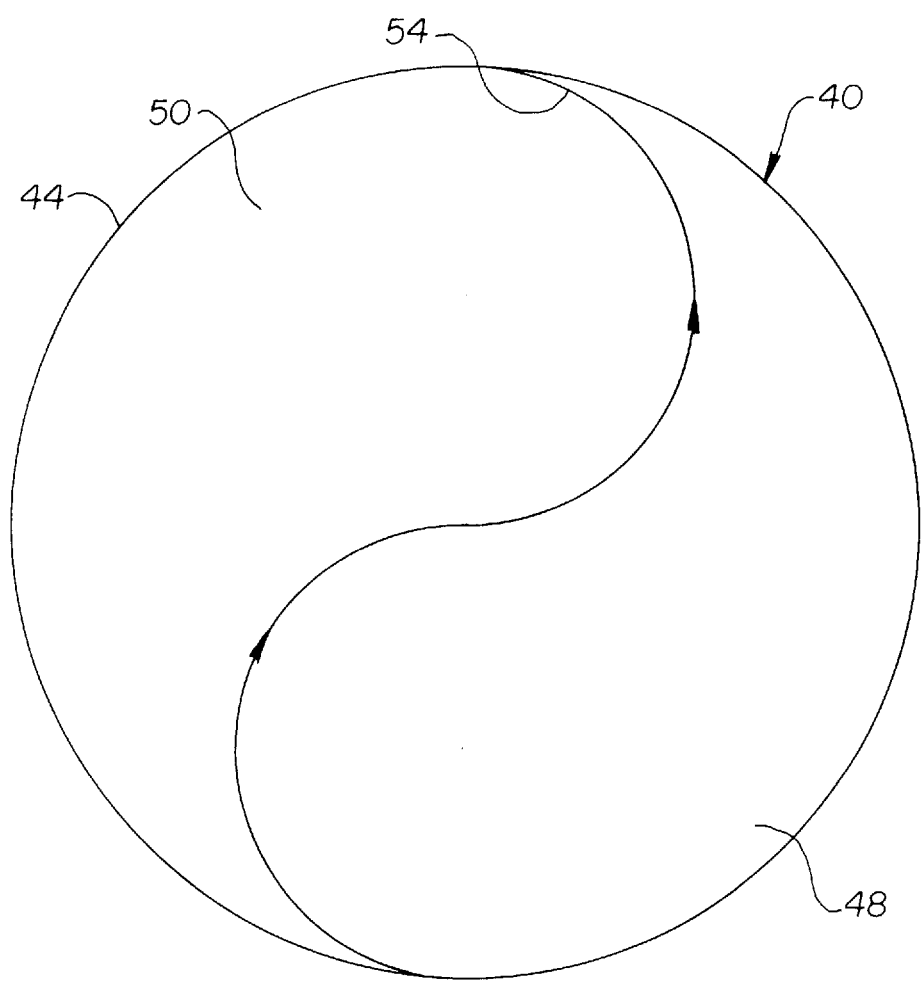
FIG. 2 is an alternate embodiment representative prior art yin and yang symbol.

FIG. 2 discloses an alternate embodiment yin and yang like structure 40 also having an outer circle 44, two equal internal sections 48, 50, and a doubly curved line 54 at the boundary of the two equal internal sections. Symbol 10 and symbol 40 are quite ancient in their derivation and have come to be representative of many opposite physical forces and concepts in natural philosophy and science. Indeed, many references extend the teachings of these symbols from applied science to the fields of theology and spirituality. In any event, there has been no recognition or suggestion for use of the underlying geometries taught in FIGS. 3–7 which relate to the usefulness of these advanced structures as models for teaching the scientific theory of the singularity.

Figure 3:
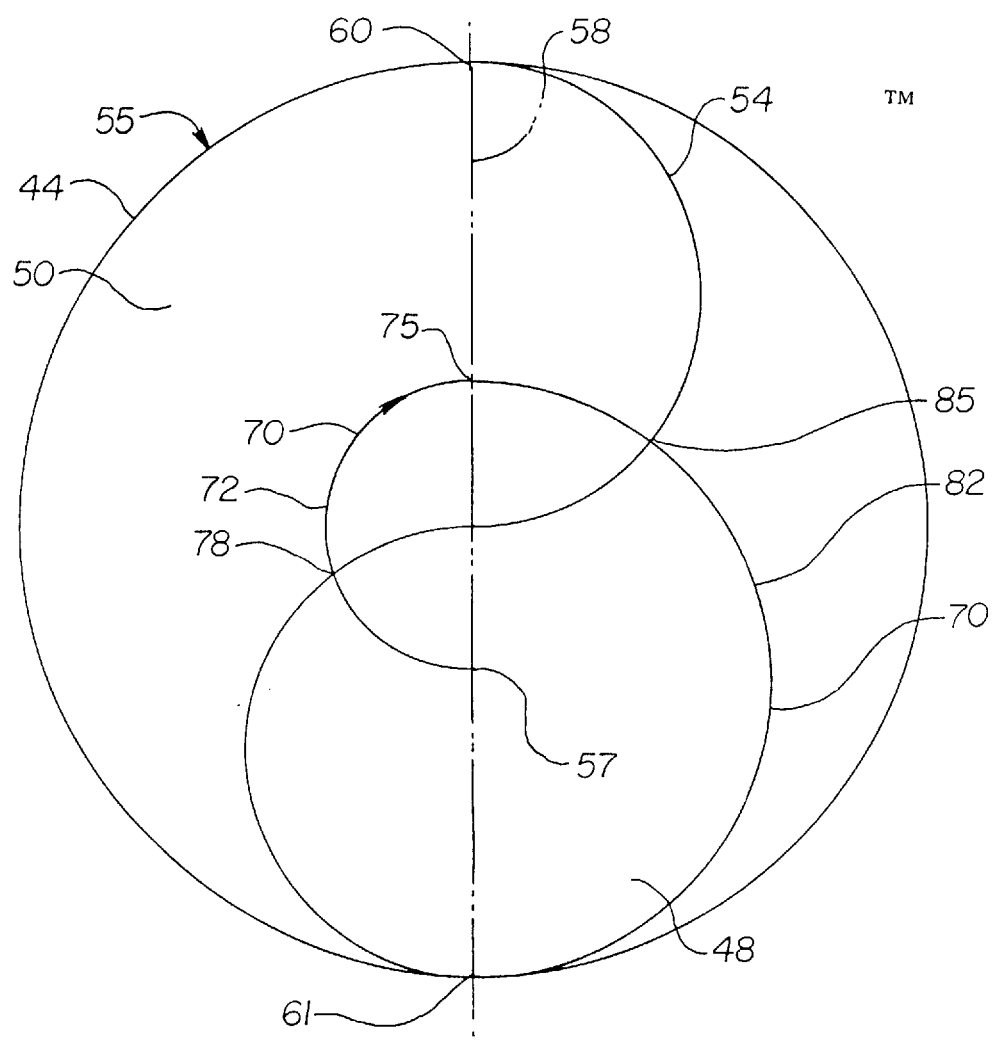
FIG. 3 discloses a yin and yang like structure but with a novel internal spiral.

FIG. 3 discloses a further embodiment of an article and method useful in teaching the core geometric construction of the yin and yang symbol, and scientific principles extending therefrom. FIG. 3 is a two-dimensional representation of an article 55 comprising an outer circle 44 defining two equal internal sections 48, 50 separated by a first doubly curved line 54. This doubly curved line has, at least, a first and a second equal length portion within any different hemisphere selected within outer circle 44, which is particularly apparent when a selected diameter line of outer circle 44 only intersects doubly curved line at the center of outer circle 44. An internal spiral start point 57 is located at a distance of one third the length of an outer circle diameter line defined by the intersections of the first doubly curved line 54 with outer circle 44, as shown in one embodiment as representative diameter line 58 extending between intersection points 60, 61. It is recognized that start point 57 is representative of a point of singularity from which the structure partially described above and more fully detailed below originates.

A first internal spiral first section 72 comprises a curved line extending from start point 57 to a reference point 75 located at a distance of two thirds the length of the selected outer circle diameter. Internal spiral first section 72 has a shape of a semi-circle and is located so that a first half of the semi-circle intersects the first doubly curved line, as shown at intersection point 78. A first internal spiral second section 82 is also provided. Second section 82 comprises a curved line extending as a semi-circle from reference point 75 to a first end point of the outer circle diameter located at first intersection point 61 of diameter line 58 with outer circle 44, which also corresponds to a zero distance along outer circle diameter line 58. First internal spiral second section 82 intersects first doubly curved line 54 at intersection point 85. Intersection point 85 is normally in a separate hemisphere from intersection point 78.

Figure 4:
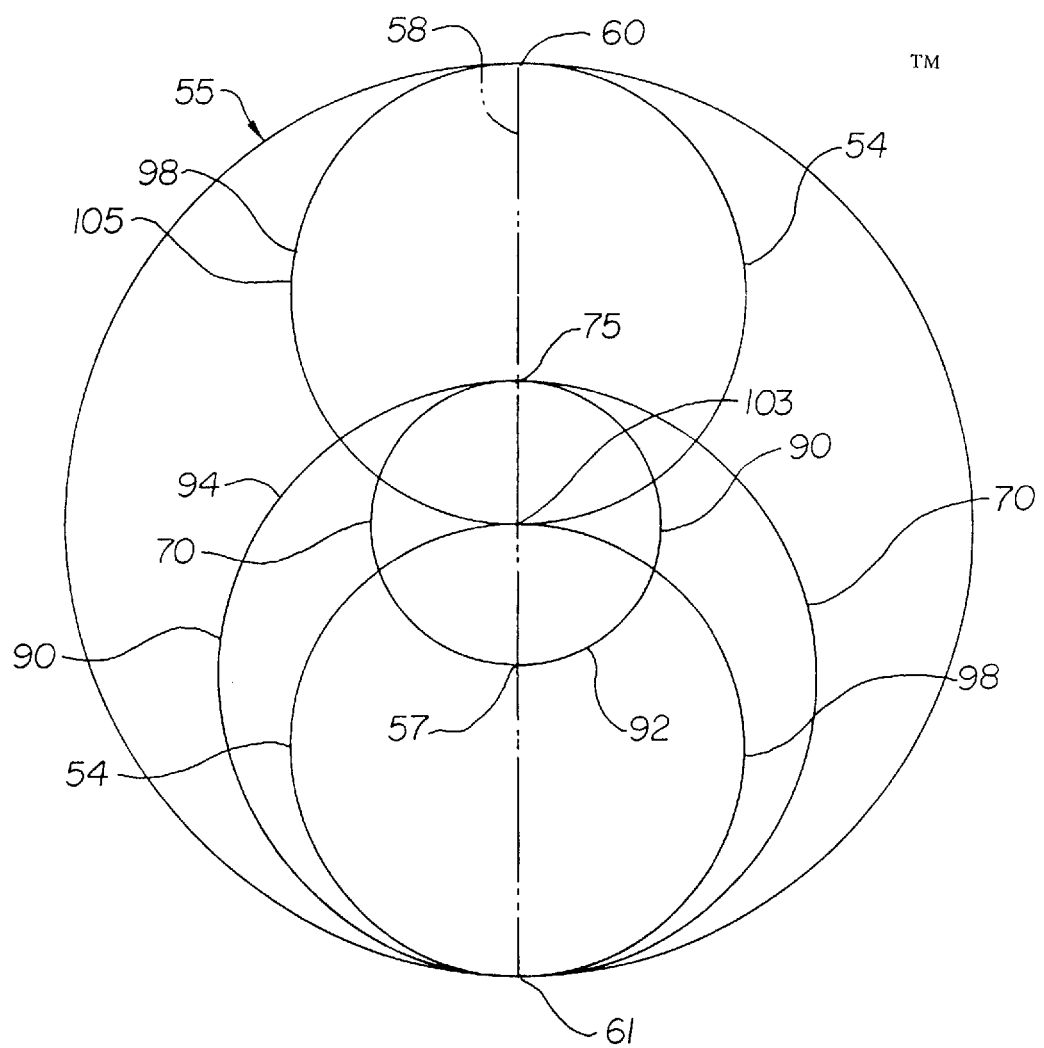
FIG. 4 discloses a yin and yang type structure having an internal spiral, and extension lines of structure within the symbol shown in dashed-line form.

Referring to FIG. 4, article 55 further comprises a second internal spiral 90 having a first section 92 comprising a curved line extending from start point 57 to reference point 75. Second internal spiral first section 92 is also shaped as a semi-circle and is located so that a second half of the semi-circle intersects doubly curved line 54. A second internal spiral second section 94 comprises a curved line extending as a semi-circle from reference point 75 to a first end point 61 of the outer circle diameter located at the intersection of the outer circle diameter with the outer circle also at a zero distance along the outer circle diameter. Essentially, the second internal spiral 90 is an identical shape and size to first internal spiral 70.

Article 55 further comprises a second doubly curved line 98 comprising a first semi-circle 100 extending from first intersection point 61 to the center point 103 of outer circle 44. The first semi-circle 100 is located on the other side of the designated diameter line 58 from one of the first doubly curved line equal length portions. Second doubly curved line first semi-circle 100 has a radius of curvature identical to the radius of curvature of the opposing equal length portion of the doubly curved line 54. Second doubly curved line 98 also comprises a second semi-circle 105 extending from center point 103 to the intersection of first doubly curved line 54 with outer circle 44 at the designated diameter line second intersection point 60. Second semicircle 105 is located on the other side of the designated diameter line 58 from one of the equal length portions of the first doubly curved line 54 and has a radius of curvature identical to the opposing equal length portion.

Figure 5:
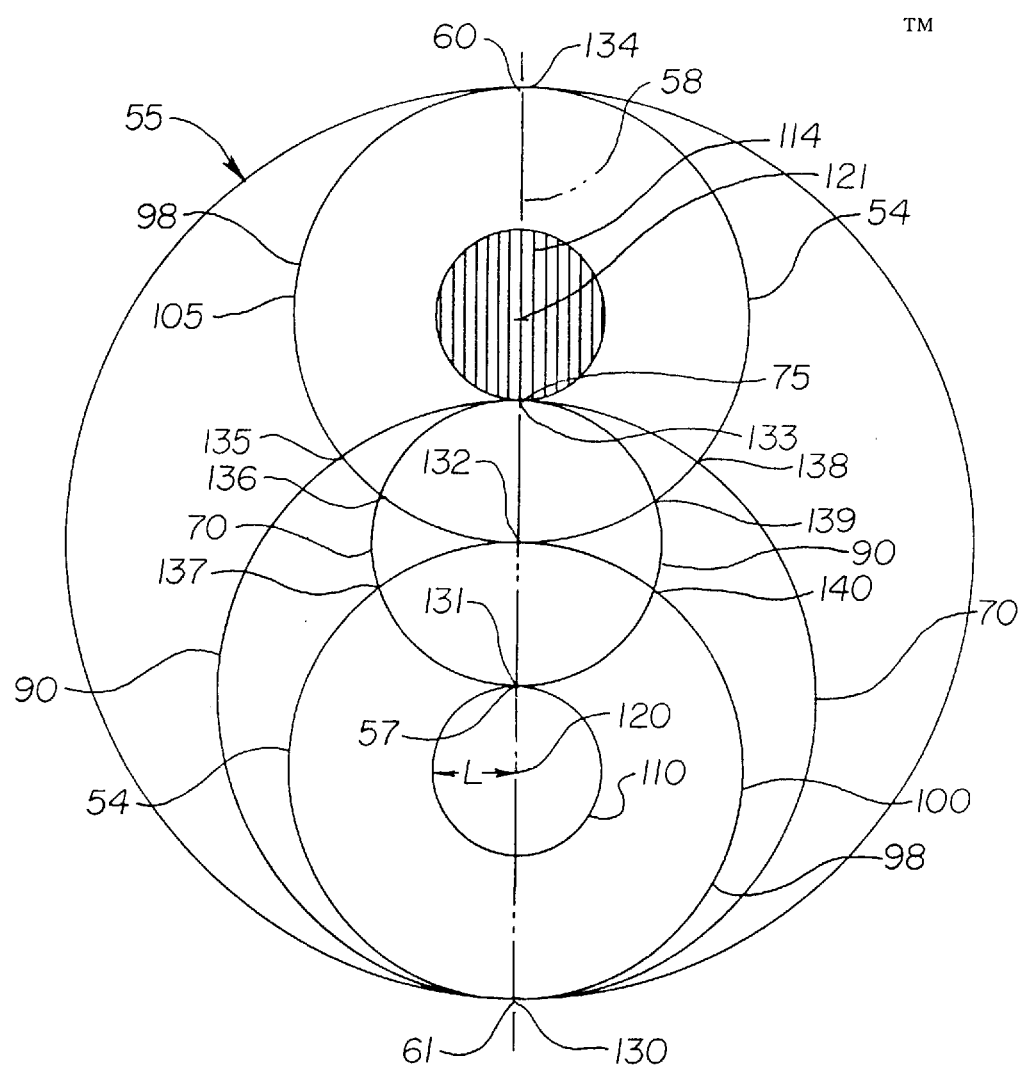
FIG. 5 discloses a yin and yang like structure having a plurality of fully formed internal spirals.

Referring to FIG. 5, article 55 further comprises a circle 110 with a circumference line extending through internal spiral start point 57 and a circle 114 with a circumference line extending through reference point 75. Each of the circles 110, 114 comprise a diameter line which is coincident with the selected outer circle diameter line 58. Each circle 110, 114 has a diameter that is one-sixth the length of the selected outer circle diameter. Alternately, each circle 110, 114 has a center point determined by the effective center point location of the combination of semi-circle 100 with its opposing and matching semi-circle comprising a portion of first doubly curved line 54. The center point of this combination of semi-circles, which form an effective circle, is the center point of circle 110, with a similar derivation being utilized for forming the center point of circle 114 using semi-circle 105 and its opposing semi-circle comprising a portion of first doubly curved line 54. Each of these center points are then used to form radii of respective circles 110, 114 having a length L defined by the distance between the center points 120, 121, and internal spiral start point 57 and reference point 75, respectively.

Figure 6:
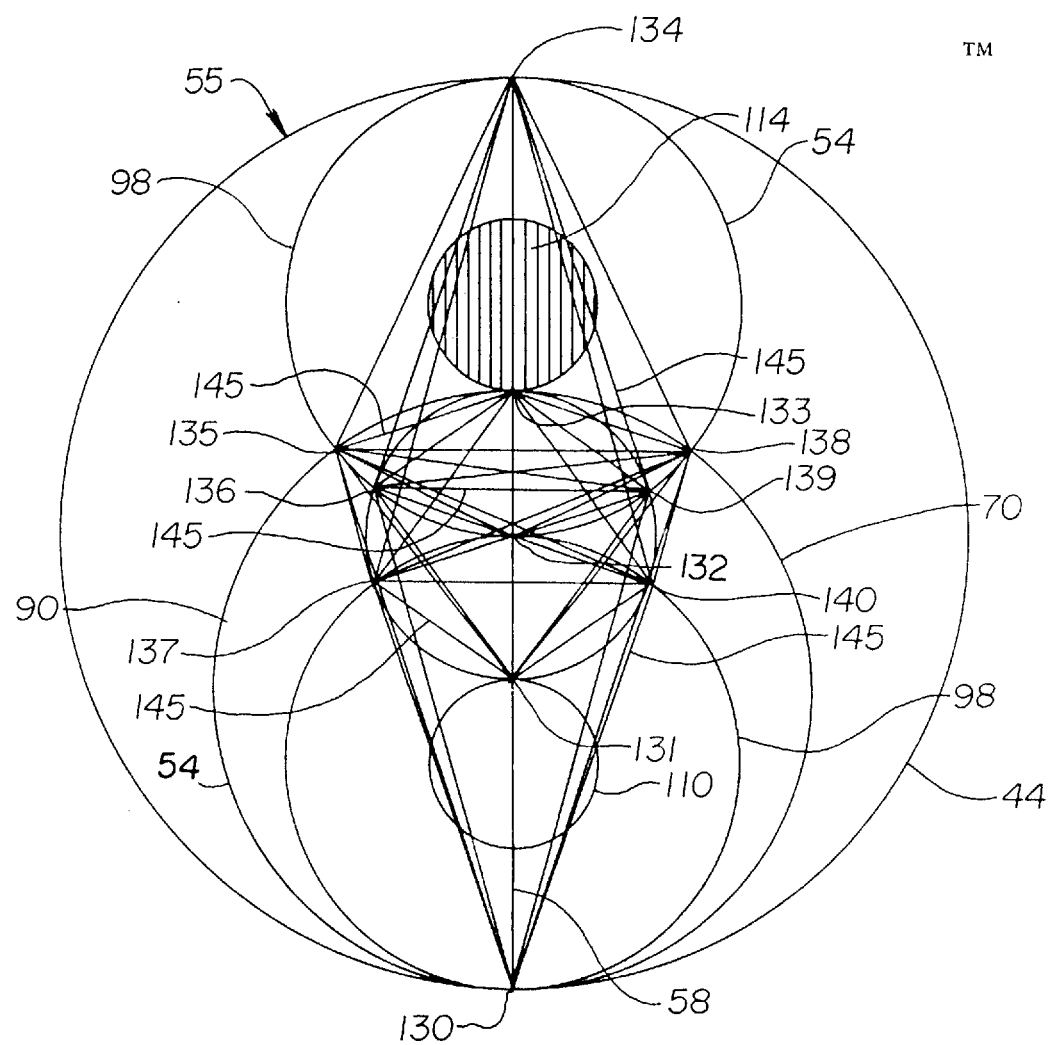
FIG. 6 discloses a plurality of intersection locations and a plurality of straight lines extending from each designated intersection location to every other designated intersection location.
Figure 7:
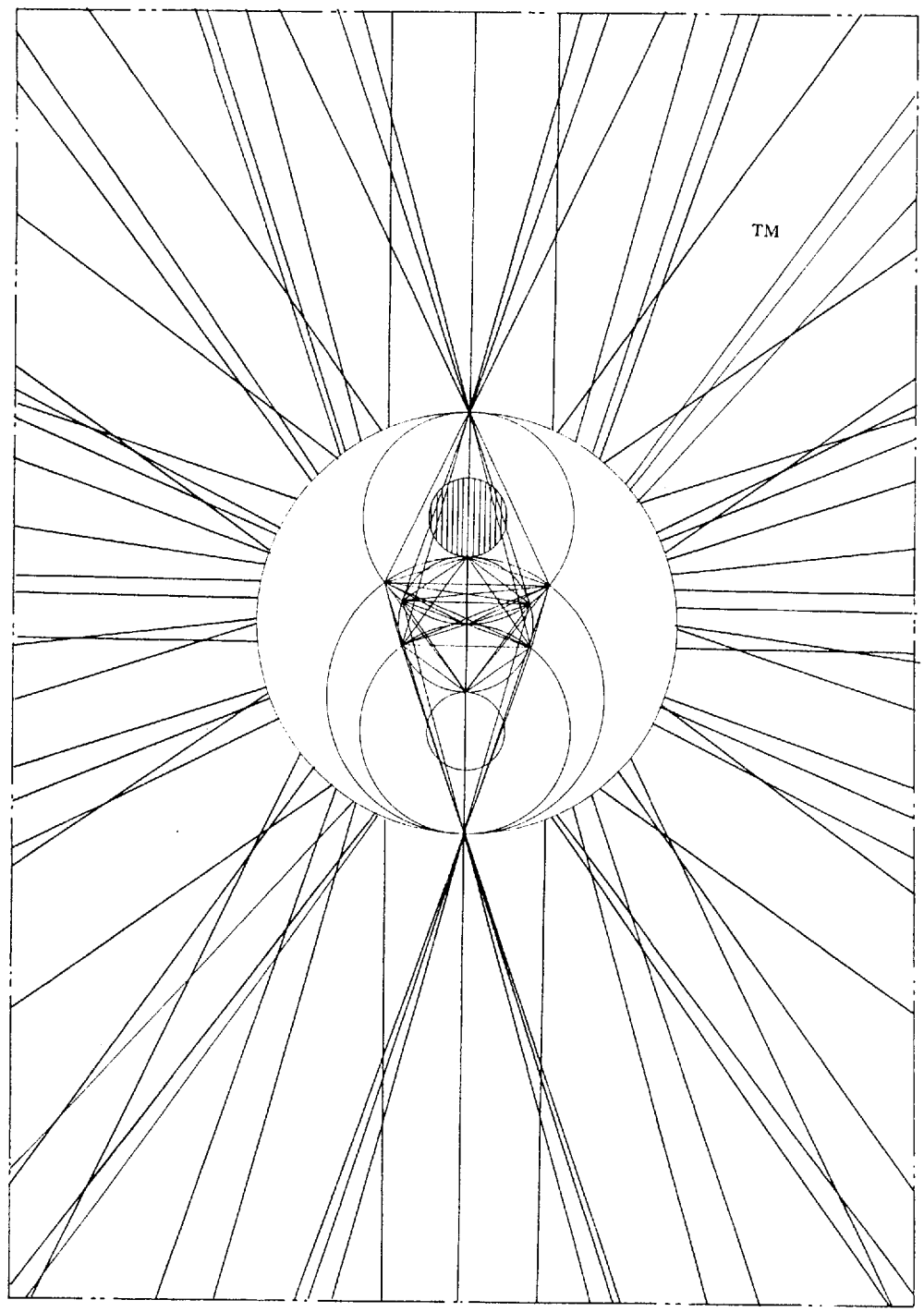
FIG. 7 discloses the extension of the plurality of straight lines extending from each designation intersection location within the yin and yang like structure.

Referring further to FIG. 5 there is shown a plurality of designated intersection locations 130, 131, 132, 133, 134, 135, 136, 147, 138, 139, and 140. These designated intersection locations are formed by the intersection of curved line segments of doubly curved lines 54, 98, the internal spirals 70, 90, and the circles 110, 114. Preferably, a plurality of straight lines such as any of lines 145 shown in FIG. 6, are extended from each designated section location to every other designated intersection location. Preferably, each of straight lines 145 is extended beyond outer circle 14. Further, each of straight lines 145 connecting the 7th and 8th designated intersection locations, i.e., locations 136, 137, and the 10th and 11th designated intersection locations, i.e., locations 139, 140, is extended to a boundary Distance external of outer circle 14. Boundary distance D is the distance at which the extended lines 151 intersect the extension of the straight line 155 connecting the 1st and the 5th designated intersection locations. Straight line 155 is an extension beyond outer circle 14 of designated diameter line 58. Article 55, with extended lines 151, 155 now lies within a boundary circle 161 having a center point at the center of outer circle 14 and having a radius equal to the boundary distance D.

Discussions and analyses of theoretical laws of physics relating to singularity theorems often require assuming a point in time representative of the beginning of the universe. This is described in one example by the work of Drs. Steven Hawking and Roger Penrose, in which the beginning of the universe was a "singularity" comprising a mathematical point of infinite density. As pointed out in other works, for example by the work of the theoretical physicist Dr. David Lindsley, the singularity demanded by classical general relativity was supposed to be an infinite amount of energy at a single point. While yet in quantum mechanics no physical object can be given a precise location, but rather a greater or lesser probability of being in one place or another. It is an objective of this invention to provide a model which reconciles this known contradiction and to provide means for enabling further research and teaching of this concept. As discussed above with particular reference to FIGS. 1–7, the well known yin and yang symbol (FIG. 1) provides a useful building block to construct a tool for proving that the known contradiction referred to above is actually only an apparent contradiction. In particular, it may be shown using the teachings of the invention that indeed the relative probabilities of positioning a point of singularity using quantum physics is not inconsistent with the teachings of Hawking and others requiring a fixed point of singularity.

Figure 1:
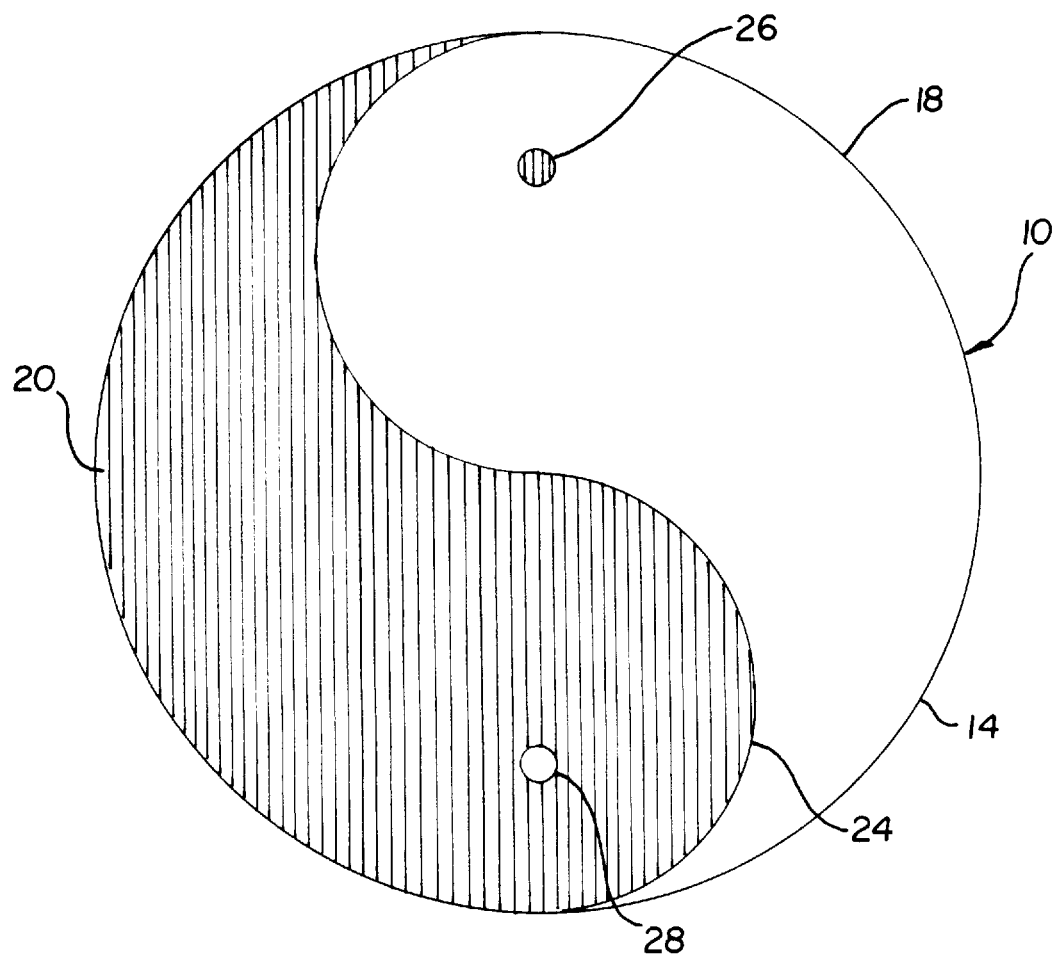
FIG. 1 is a representative prior art yin and yang symbol.

FIGS. 1 and 2 illustrate variations on the ancient yin and yang symbol representative of balance and harmony in the universe. The yin and yang symbol is also useful, when analyzed as described herein, for illustrating the unity of physics with the motion of a point of singularity. In this teaching, an initial condition is a void into which is placed a single point represented, for example, by start point 56 shown in FIG. 3. It is recognized that start point 56, from the perspective of FIG. 3 represents a single point but the entire outer circle 44 from a distance or a different vantage would appear to be the same as start point 56. The relevance of this clarification is that it is necessary as an initial condition in this theory to designate a point that is representative of a point of singularity while simultaneously recognizing that each point comprises smaller points which are further explained by the motion theory described below.

Figure 8:
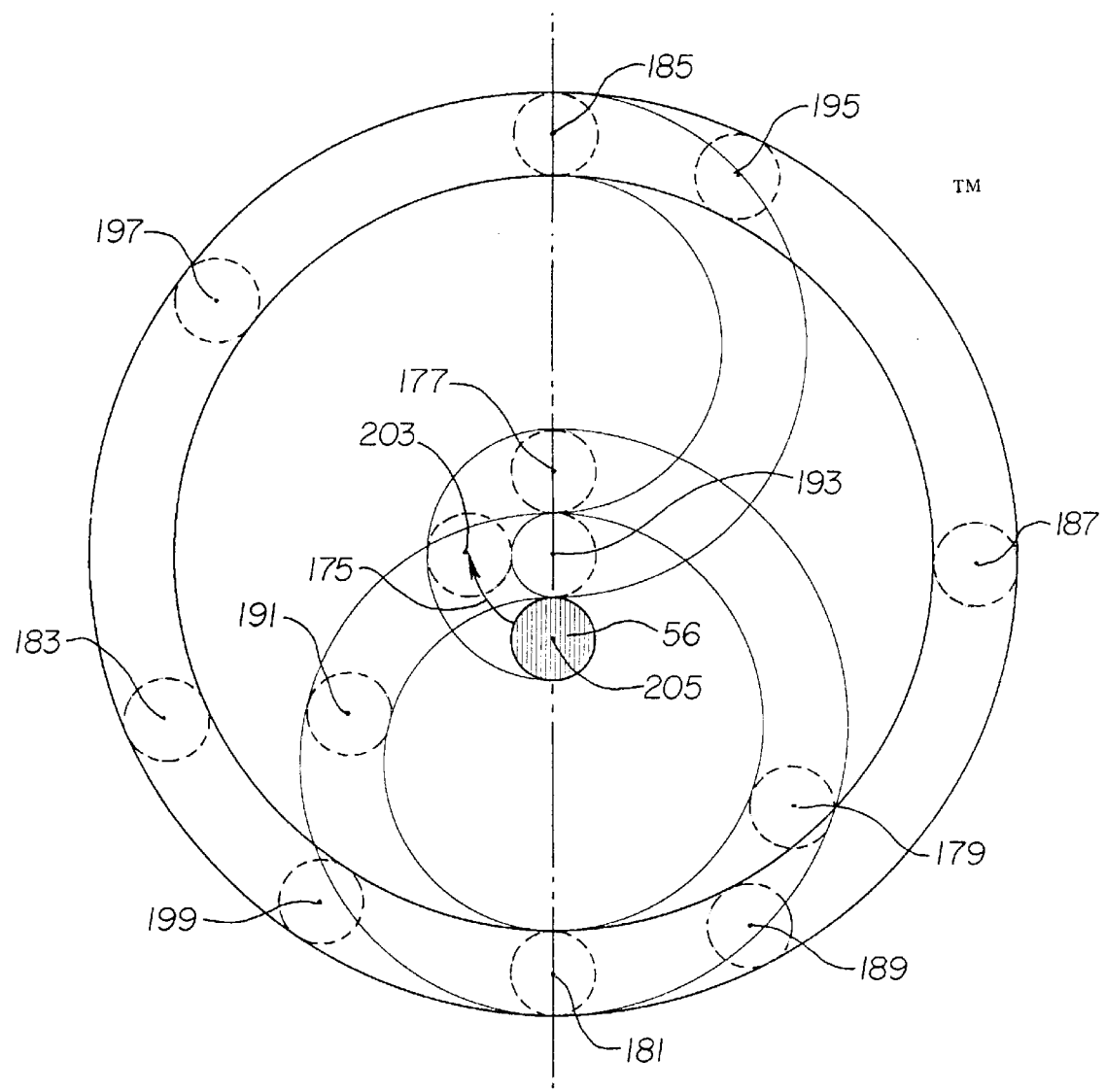
FIG. 8 discloses an exemplary path of motion of a point of singularity.

Referring then to FIG. 8, a representative point of singularity is designated as start point 56 represented as a circle. The circle is actually representative of a sphere when viewed in three dimensional orientation. While any initial path of motion of start point 56 is possible, and likely, representative path designated by arrow 175 is selected. Start point 56 then travels to subsequent locations 177, 179, 181, 183, 185, 187, 189, 191, 193, 195, 197, 199, 201, 203, and completion point 205. As shown in FIG. 8, the path of motion of the point of singularity from internal spiral start point along the extended paths comprising portions of the known yin and yang tracks results in a return of the point of singularity to completion point 205 which is identical to start point 56. This method, therefore, discloses use of the yin and yang symbol to teach the scientific theory of singularity, e.g., how a point of singularity actually has motion shown by the geometry of the motion of the point of singularity. This motion, as shown in FIG. 8, results in a recreative unified pattern from a start point to a completion point.

Figure 9:
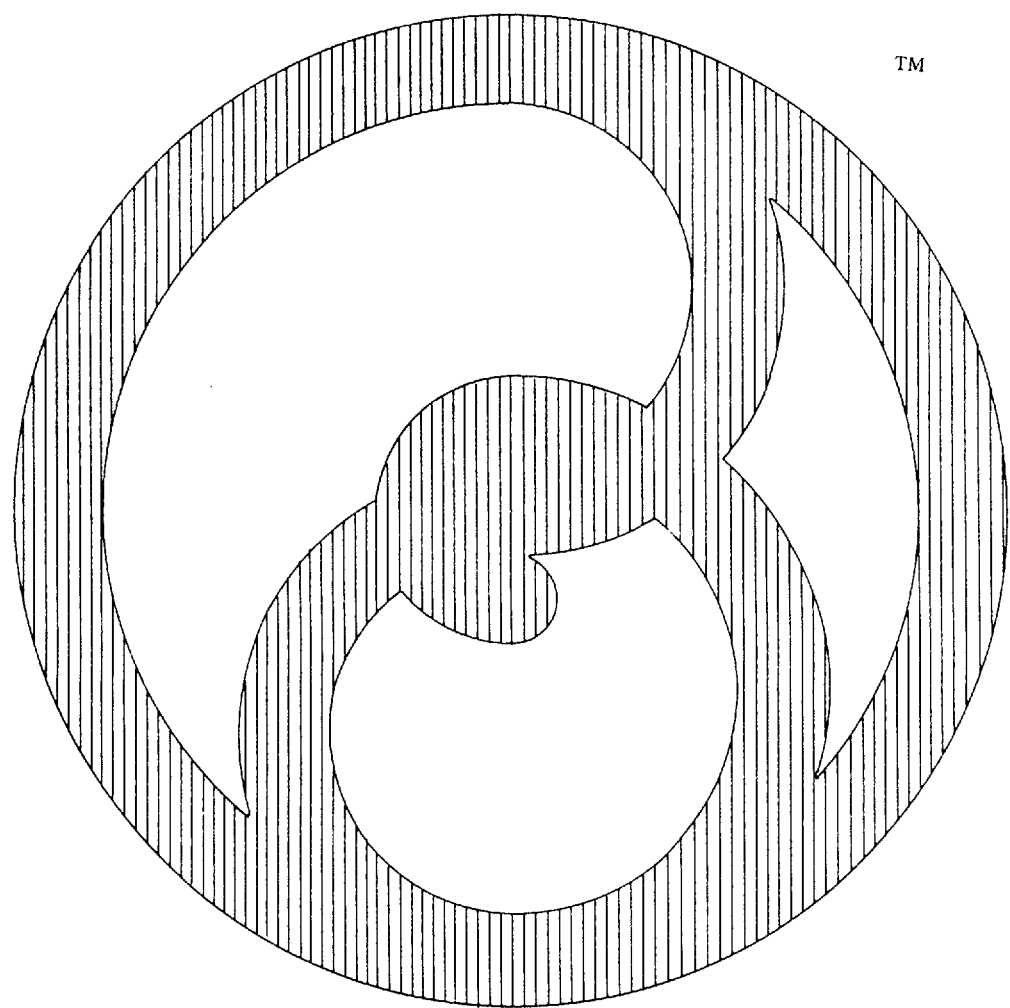
FIG. 9 discloses an exemplary path of motion of a point of singularity.

No known reference to this unity theory exists. Indeed, the invention utilizes the known, but limited, geometries of the yin and yang symbols and combines those geometries with principals of modern theoretical physics. This results in a model and method of teaching the core construction of the yin and yang symbol as one which, when extended, using the concepts and teachings disclosed herein, further discloses a model of the scientific theory of singularity. This is one example in which the above discussed reconciliation between quantum physics theory and classical general relativity is disclosed. FIG. 9 is another depiction of the paths of motion shown in FIG. 8.

Figure 10:
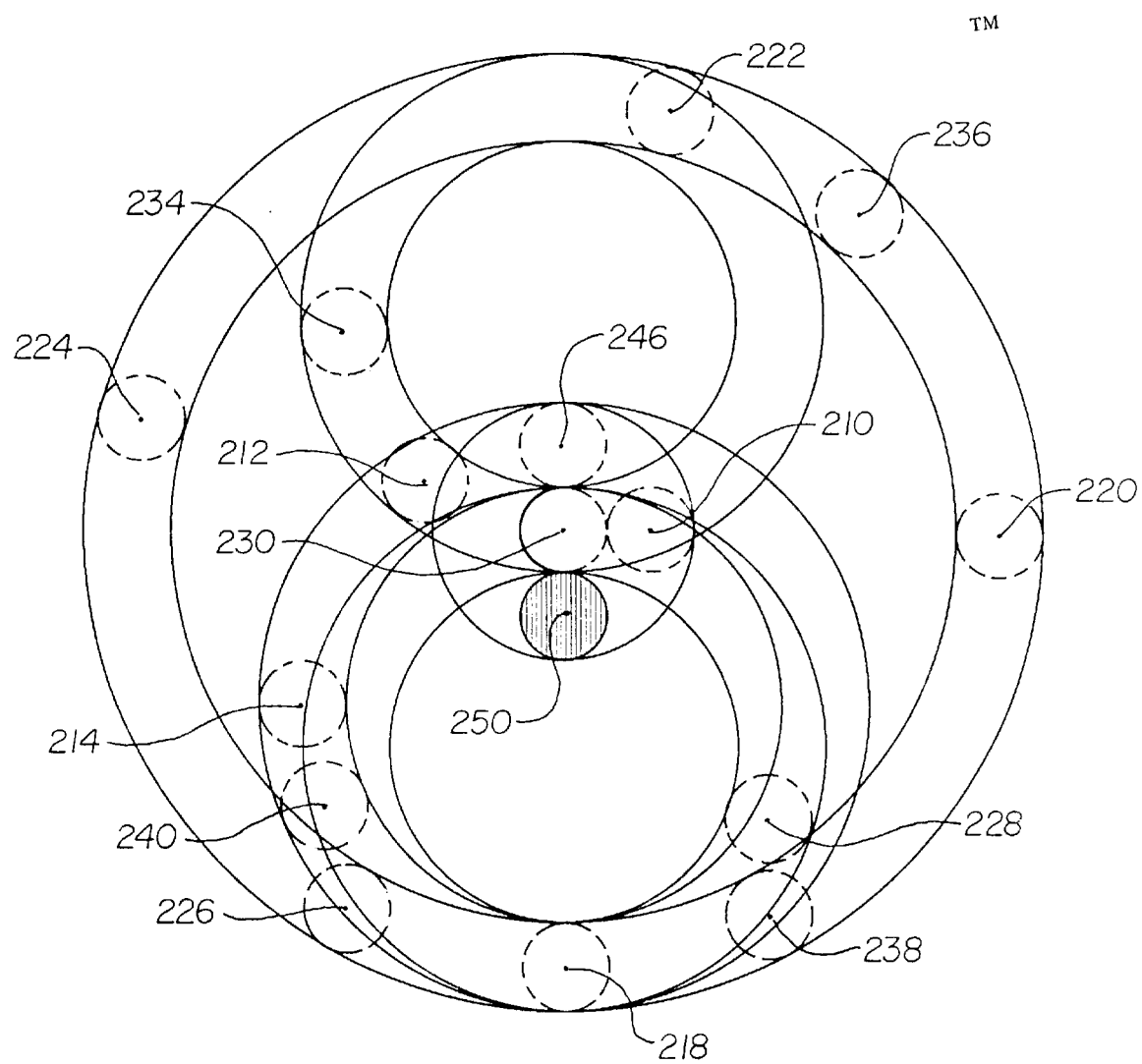
FIG. 10 discloses an exemplary path of motion of a point of singularity.

A further interesting discovery relating to this invention is disclosed in FIG. 10 in which a further similar path of the point of singularity is extended as a symmetrical mirror image of the motion disclosed in FIG. 8. Actually, FIG. 10 is consistent with the theoretical physicists' isotropic concept that the universe, however defined, looks identical from all view points.

Figure 11:
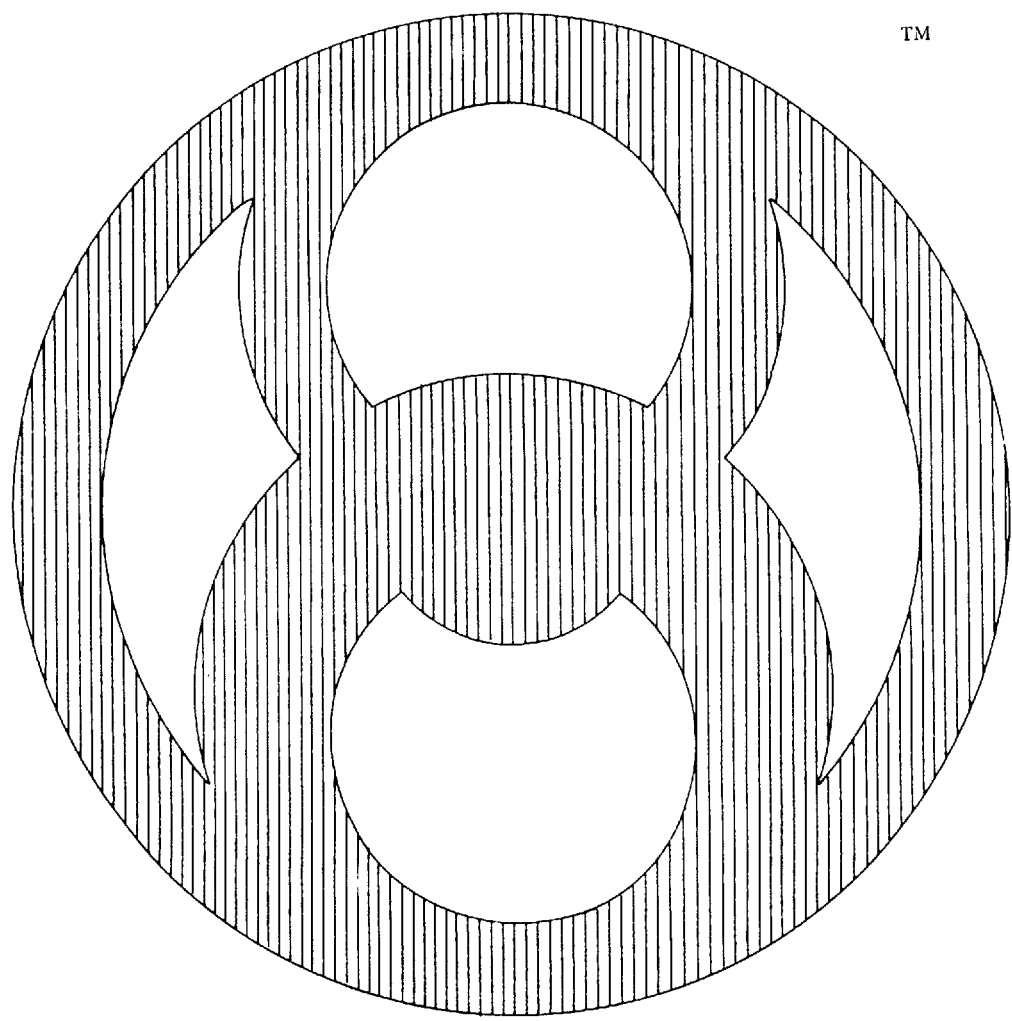
FIG. 11 discloses an exemplary path of motion of a point of singularity.

FIG. 11 is similar to FIG. 9 in disclosing in simple form a path of the motion of a point of singularity, but as disclosed in FIG. 10. What is of further interest in the depiction of FIG. 11 is the abstract similarity to the symbol for infinity, initially introduced by John Wallis in 1655. It is not believed that Wallis recognized how to achieve the derivation of this form of infinity symbol, however, it is widely recognized that when used in relation to geometry infinity is regarded as a "location". For example, as disclosed in the "Dictionary of Mathematics," first publication in 1989, by Penguin Books Limited, pages 173–174. The idea of infinity as a location was further introduced by Johan Keppler and further developed by Gerard Desargues who assumed the existence of an ideal point at infinity. Both researchers were mathematicians working in the field of geometry. It is yet another aspect of this invention to provide a method of teaching a further derivation of the mathematical symbol of infinity. The symbol shown in FIG. 11 may be utilized as simply the inter-woven dissimilar sized circles within the outer circle or as also including the outer circle, representative of the unity concepts disclosed throughout the invention. This depiction is distinct in appearance and concept from any prior symbols for infinity.

Figure 12:
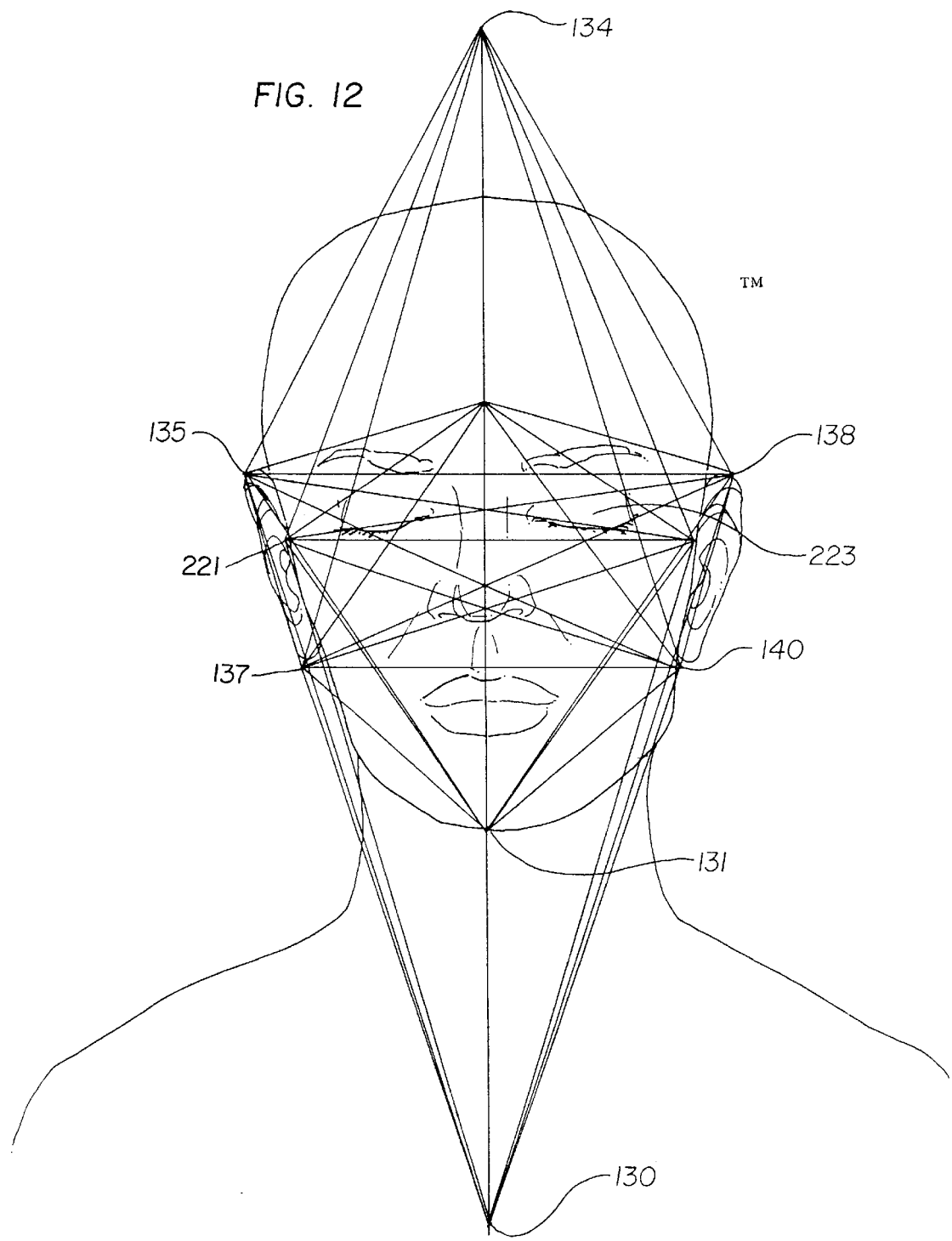
FIG. 12 is a front elevation anatomical view of a human face with an overlay of points discovered in the invention.
Figure 13:
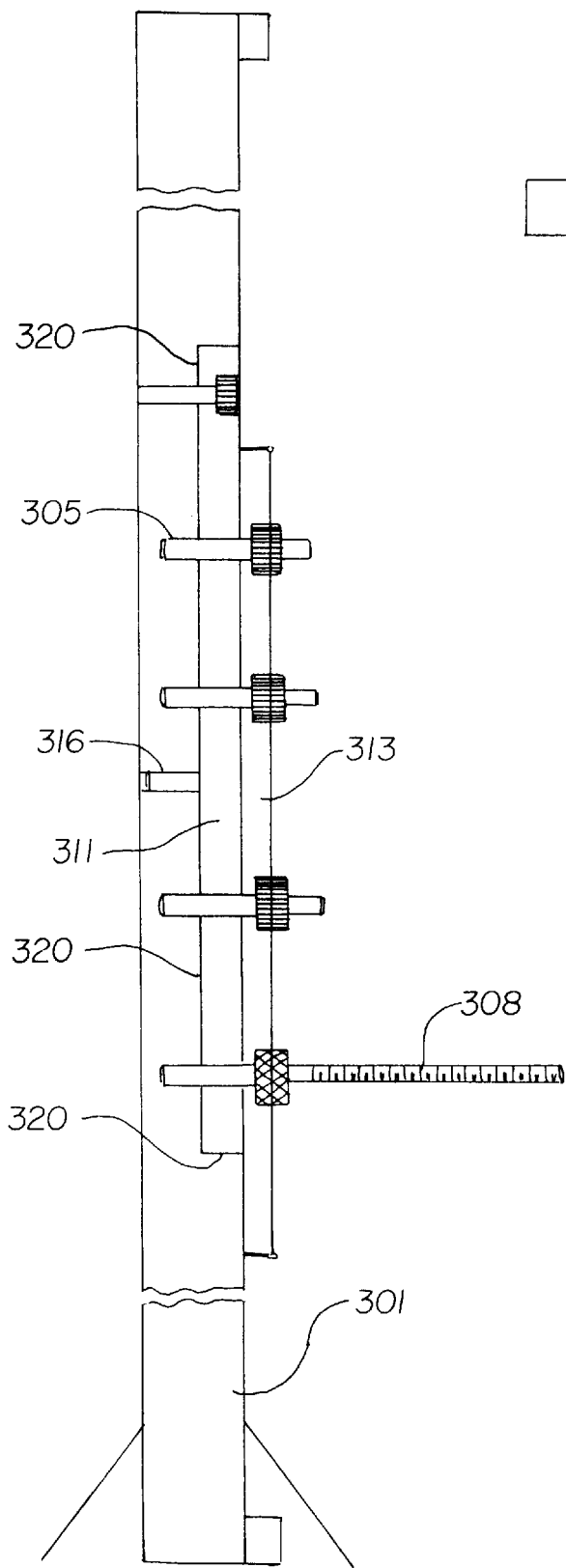
FIG. 13 is a side section view of a template mechanism constructed for practicing the method of this invention.

FIGS. 6, 12 and 13 disclose yet another feature of this invention. In FIG. 6, there is disclosed a plurality of designated intersection locations as discussed above. Of particular interest are intersection locations 135 and 138. If each of these intersection locations are designated as top points of a human ear, and the line extending between points 135, 138 represents a brow line of a human, then the form of a human face becomes more clear. For example, further extending the analysis it is possible to see that the results of the various intersection locations create eye socket-like spaces at locations 221, 223. The intersection locations 137, 140 further define a connecting line which functions as the approximate horizontal center line of a human palate, and the location 131 depicts a representative base of a human chin. The proportionality (i.e. physiological accuracy of length ratios of vectors defined between these locations) of the resulting human face, shown in FIG. 12, is striking. Accordingly, the model depicts quite accurately the unity of the point of singularity, the yin and yang symbol, and the human face.

FIGS. 13 depicts a model 301, which is representative of several types of possible models, in which are placed a plurality of pin receiving apertures 305 suitable for receipt of turning pins 308. Turning pins 308 are designed for ease of placement into apertures 305 and are of sufficient length to retain intervening templates, for example template 311, and template 313. An additional optional embodiment includes a push-out mechanism, which may simply be a chamber, or a physical structure designed for pushing through a chamber, as shown at 316. This push-out structure is designed for removal of template 311. As shown in this embodiment, template 311 is designed for placement within a recess portion 320 of article 301.

Figure 14:
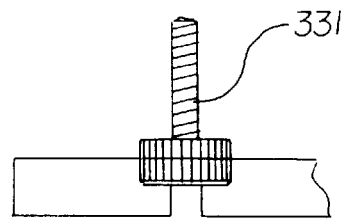
FIG. 14 is a section view of a portion of the template mechanism.
Figure 15:
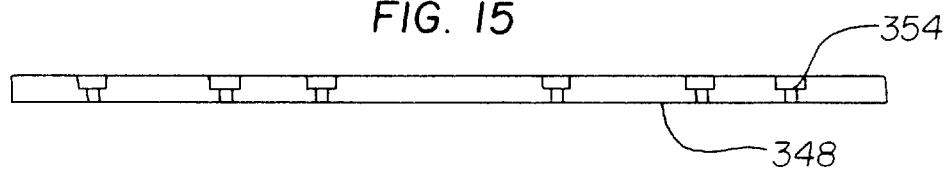
FIG. 15 is a section view of a portion of the template mechanism.

FIG. 14 shows use of a turning tool 331, similar to structures 308 shown in FIG. 13. FIG. 15 illustrates an outer template, similar to that shown and depicted as template 313 in FIG. 13, but in the FIG. 15 illustration the template 348 comprises a plurality of apertures 354 or recessed areas suitable for placement therein of turning tool 331 or similar instrument suitable for achieving the necessary turning functionality described herein below.

Figure 16:
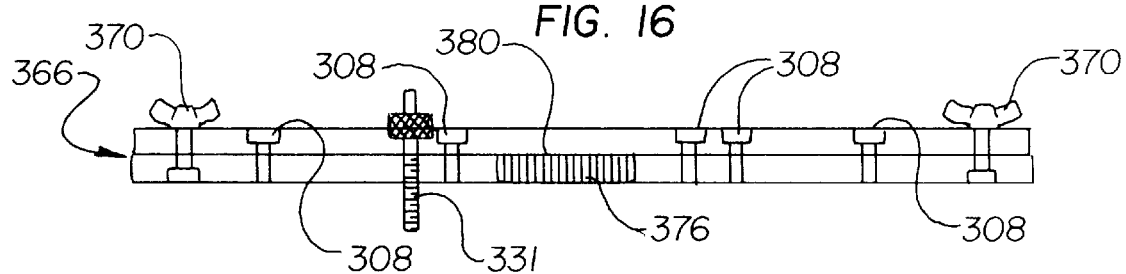
FIG. 16 is a section view of a portion of the template mechanism.
Figure 17:
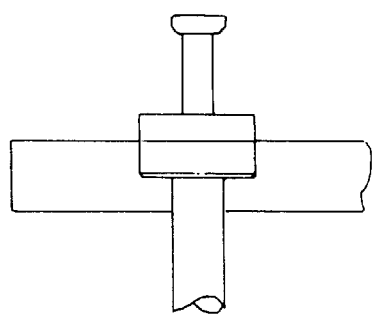
FIG. 17 is a section view of a portion of the template mechanism.
Figure 18:
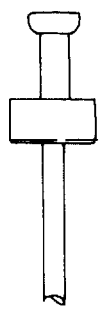
FIG. 18 is a section view of a portion of the template mechanism.
Figure 19:
FIG. 19 is a section view of a portion of the template mechanism.

FIG. 16 illustrates an assembled template subassembly 366 having a plurality of templates assembled together using wing nut-type holders 370, or similar connection means, some of which may be placed partially in recessed portions of one or more of the templates. As shown in FIG. 16 it is possible to assemble a marking device, such as a felt tip marker or the like at one or more locations, such as that shown and depicted at location 376. In this embodiment, at location 376, marker 380 is shown. Turning tool 331 and turning pins 308 are also shown in operation. FIGS. 17, 18 and 19 illustrate various embodiments of turning tools 331, all of which are used in combination with subassembly 336 and structure 301 in achieving the objectives of this invention.

Figure 20:
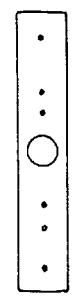
FIG. 20 is a section view of a portion of the template mechanism.
Figure 21:
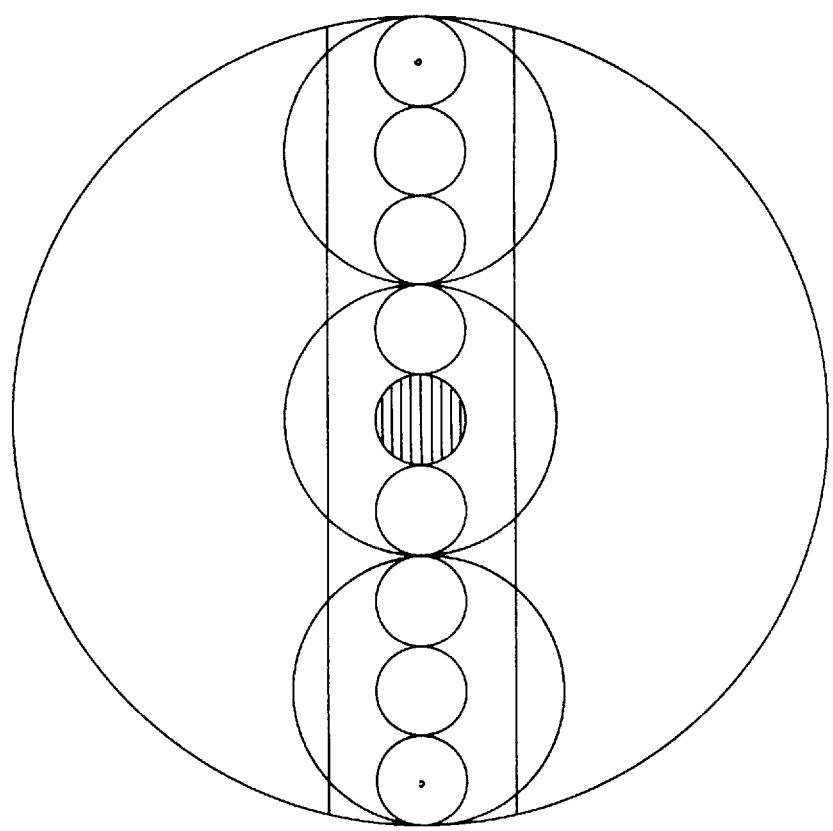
FIG. 21 is a section view of a portion of the template mechanism.
Figure 22:
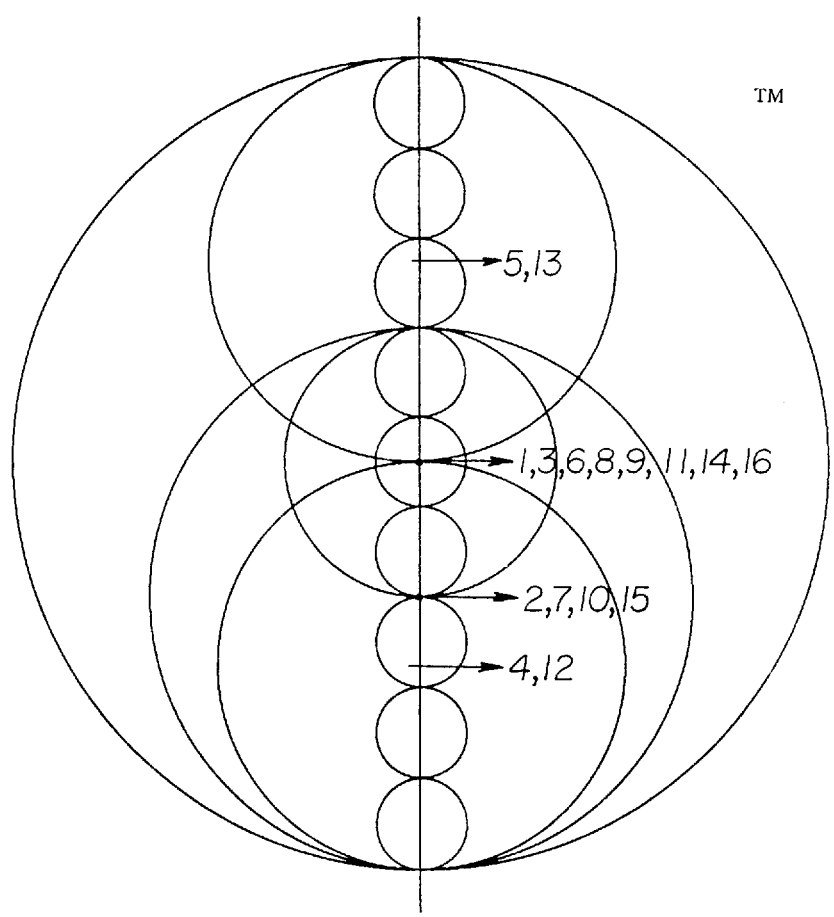
FIG. 22 is a plan diagram depicting the motion phases of the template.
Figure 23:
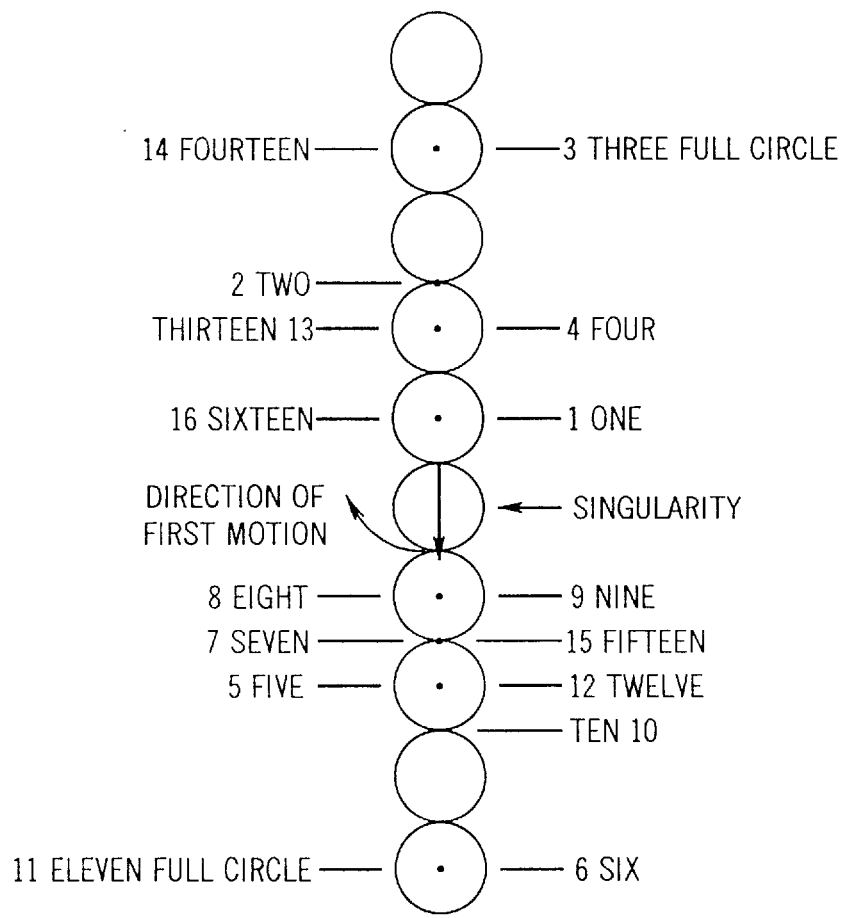
FIG. 23 is a plan view of a magnetic field diagram relating to the field created by the motion of a point of singularity.
Figure 24:
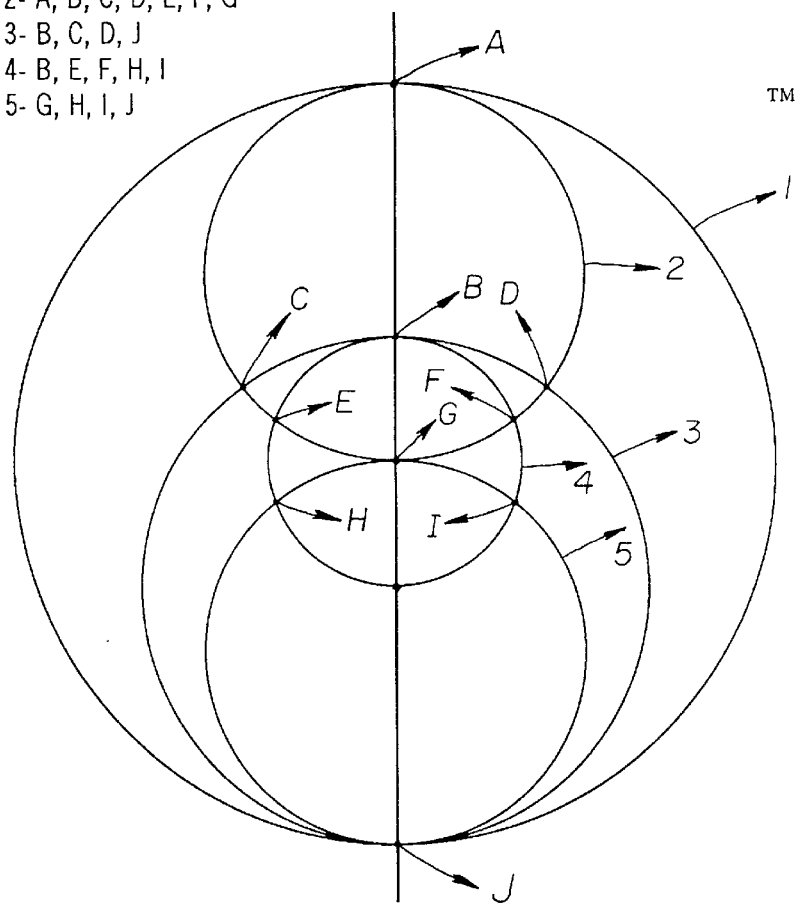
FIG. 24 is a plan diagram depicting the phase points of the template mechanism.

Referring to FIGS. 20 and 21, it is shown how through various placements of turning pins 308, turning tools 331, and various holding pins and marker locations, it is possible to depict the various motions of the point of singularity, as described above, for purposes of teaching such related theories. FIGS. 22–24 further illustrate examples of sequential rotations and marking on virtually any markable substrate using the structures identified in FIGS. 13–21 according to the teachings above.

Figure 25:
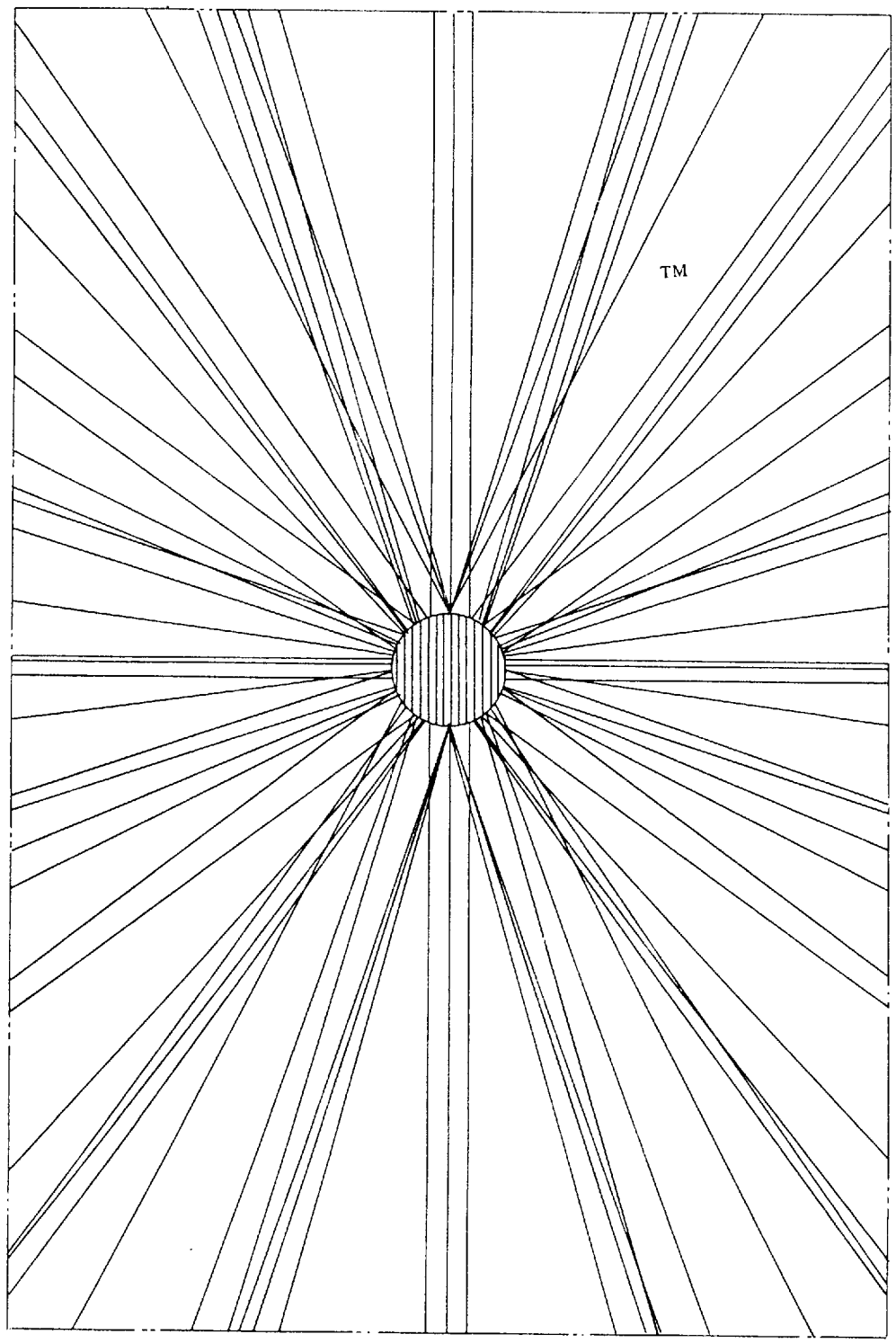
FIG. 25 is a plan view depicting the ultimate parallelism of certain extension vectors.

FIG. 25 is an example of the parallelism and symmetry achievable at certain distances beyond the point of singularity, as it relates to extensions of connection lines as described above. It is noted that at a certain ratio of distances, the central connection lines become parallel. It is also appreciated that three-dimensional models of one or more of these depictions above are contemplated within the scope of this invention.

Various modifications and alterations of the invention will become apparent to those skilled in the art without departing from the scope and spirit of the invention.

What is claimed is:

1. A method of representing a path of motion derived from the predicted motion of a point of singularity, comprising the steps of:
    a) providing template means including a template device for fixing one of a plurality of selectable rotation points of the template relative to a surface to be marked;
    b) operatively connecting a marking object to the template device;
    c) rotating the template device sequentially about a plurality of the selectable rotation points to guide the marking object to create a representation on the surface which represents the predicted motion of a point of singularity.

2. The method of claim 1 in which the rotating step includes:
    a) rotating clockwise 180° about a first point of rotation;
    b) rotating clockwise 180° about a second point of rotation;
    c) rotating clockwise 360° about a third point of rotation;
    d) rotating clockwise 180° about a fourth point of rotation;
    e) rotating counter-clockwise 180° about a fifth point of rotation;
    f) rotating counter-clockwise 180° about a sixth point of rotation;
    g) rotating counter-clockwise 180° about a seventh point of rotation;
    h) rotating counter-clockwise 180° about an eighth point of rotation;
    i) rotating counter-clock-wise 180° about an ninth point of rotation;
    j) rotating counter-clockwise 180° about an tenth point of rotation;
    k) rotating counter-clockwise 360° about an eleventh point of rotation;
    l) rotating clockwise 180° about a twelfth point of rotation;
    m) rotating clockwise 180° about a thirteenth point of rotation;
    n) rotating clockwise 180° about a fourteenth point of rotation;
    o) rotating clockwise 180° about a fifteenth point of rotation;
    p) rotating clockwise 180° about a sixteenth point of rotation.

3. The method of claim 1 in which the marking object is operatively connected to a surface of the template device facing the surface being marked on.

4. The method of claim 1 in which the rotating step includes grasping and moving a guiding member which is operatively connected to the template device.

5. A representational article manufactured according to the method of claim 1 having:
    a) an outer circle defining two equal internal sections separated by a first doubly curved line having a first and a second equal length portions each within any different hemisphere of the outer circle;
    b) an internal spiral start point located at a distance of one third the length of an outer circle diameter defined by the intersections of the first doubly curved line with the outer circle;
    c) a first internal spiral first section comprising a curved line extending from the start point to a reference point located at a distance of two thirds the length of the selected outer circle diameter, the internal spiral first section having a shape of a semi-circle and being located so that a first half of the semi-circle intersects the first doubly curved line; and d) a first internal spiral second section comprising a curved line extending as a semi-circle from the reference point to a first end point of the outer circle diameter located at the intersection of the outer circle diameter with the outer circle at a zero distance along the outer circle diameter.

6. The article of claim 5 further comprising a second internal spiral having a first section comprising a curved line extending from the start point to a reference point located at a distance of two thirds the length of the selected outer circle diameter, the second internal spiral first section having a shape of a semi-circle and being located so that a second half of the semi-circle intersects the doubly curved line, and a second internal spiral second section comprising a curved line extending as a semi-circle from the reference point to a first end point of the outer circle diameter located at the intersection of the outer circle diameter with the outer circle at a zero distance along the outer circle diameter.

7. The article of claim 6 in which the second internal spiral is an identical shape and size to the first internal spiral.

8. The article of claim 6 further comprising a second doubly curved line comprising a first semi-circle extending from the first end point to a center point of the outer circle, the first semi-circle being located on the other side of the designated diameter from one of the first doubly curved line equal length portions, and having a radius of curvature identical to the radius of curvature of the opposing equal length portion, and a second semi-circle extending from the center point of the outer circle to the intersection of the first doubly curved line with the outer circle at the designated diameter second end point, the second semi-circle being located on the other side of the designated diameter from a first doubly curved line equal length portion and having a radius of curvature identical to the opposing equal length portion.

9. The article of claim 8 further comprising a circle with a circumference line extending through the internal spiral start point and a circle with a circumference line extending through the reference point, each of the circles having a diameter line which is coincident with the selected outer circle diameter line and each circle having a diameter that is one sixth (0.166) the length of the selected outer circle diameter.

10. The article of claim 9 further comprising a plurality of designated intersection locations formed by the intersection of curved line segments of the doubly curved lines, the internal spirals, and the circles with a circumference line extending through the reference point and the internal spiral start point, and a plurality of straight lines extending from each designated intersection location to every other designated intersection location.

11. The article of claim 10 comprising a first through an eleventh designated intersection locations.

12. The article of claim 11 in which each of the straight lines is extended beyond the outer circle.

13. The article of claim 12 in which each of the straight lines connecting the seventh and eighth designated intersection locations and the tenth and eleventh designated intersection locations is extended to a boundary distance external of the outer circle at which the lines intersect the extension of the straight line connecting the first and the fifth designated intersection locations.

14. The article of claim 13 comprising a boundary circle having a center point at the center of the outer circle and having a radius equal to the boundary distance.

15. A method of using an article to teach the core construction of a yin and yang symbol, comprising the steps of:

a) providing a modified yin and yang symbol in the form of an operational model comprising the elements of:
   i) an outer circle defining two equal internal sections separated by a first doubly curved line having a first and a second equal length portions each within any different hemisphere of the outer circle;
   ii) an internal spiral start point located at a distance of one third the length of an outer circle diameter defined by the intersections of the first doubly curved line with the outer circle;
   iii) a first internal spiral first section comprising a curved line extending from the start point to a reference point located at a distance of two thirds the length of the selected outer circle diameter, the internal spiral first section having a shape of a semi-circle and being located so that a first half of the semi-circle intersects the first doubly curved line; and
   iv) a first internal spiral second section comprising a curved line extending as a semi-circle from the reference point to a first end point of the outer circle diameter located at the intersection of the outer circle diameter with the outer circle at a zero distance along the outer circle diameter;

b) designating the internal spiral start point as a representative point of singularity within the modified yin and yang symbol; and c) producing a representative path of motion of a point of singularity starting at the interval spiral start point and finishing when the point of singularity returns for the second time to the internal spiral start point, the path of motion produced thereby demonstrating the coincidence with and derivation of the lines forming the yin and yang symbol.

16. An article useful in teaching the core construction of the yin and yang symbol, comprising:

a) an outer circle defining two equal internal sections separated by a first doubly curved line having a first and a second equal length portions each within any different hemisphere of the outer circle;

b) an internal spiral start point located at a distance of one third the length of an outer circle diameter defined by the intersections of the first doubly curved line with the outer circle;

c) a first internal spiral first section comprising a curved line extending from the start point to a reference point located at a distance of two thirds the length of the selected outer circle diameter, the internal spiral first section having a shape of a semi-circle and being located so that a first half of the semi-circle intersects the first doubly curved line; and d) a first internal spiral second section comprising a curved line extending as a semi-circle from the reference point to first end point of the outer circle diameter located at the intersection of the outer circle diameter with the outer circle at a zero distance along the outer circle diameter.

17. The article of claim 16 further comprising a second internal spiral having a first section comprising a curved line extending from the start point to a reference point located at a distance of two thirds the length of the selected outer circle diameter, the internal spiral first section having a shape of a semi-circle and being located so that a second half of the semi-circle intersects the doubly curved line, and a second internal spiral second section comprising a curved line extending as a semi-circle from the reference point to a first end point of the outer circle diameter located at the intersection of the outer circle diameter with the outer circle at a zero distance along the outer circle diameter.

18. The article of claim 17 in which the second internal spiral is an identical shape and size to the first internal spiral.

* * * * *